United States Patent
Lane et al.

(10) Patent No.: US 8,015,989 B2
(45) Date of Patent: Sep. 13, 2011

(54) METHOD AND APPARATUS FOR DAMPENING PRESSURE FLUCTUATIONS IN A FLUID DELIVERY SYSTEM

(75) Inventors: John William Lane, San Jose, CA (US);
Mariusch Gregor, San Jose, CA (US);
Emir Vukotic, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 515 days.

(21) Appl. No.: 12/135,857

(22) Filed: Jun. 9, 2008

(65) Prior Publication Data
US 2009/0301567 A1    Dec. 10, 2009

(51) Int. Cl.
*F16K 21/00* (2006.01)
*F17D 1/16* (2006.01)

(52) U.S. Cl. ............... 137/14; 137/535; 251/52
(58) Field of Classification Search .......... 137/613, 137/535, 528, 614.2, 14; 251/48, 50, 52
See application file for complete search history.

(56) References Cited

U.S. PATENT DOCUMENTS

| | | | | |
|---|---|---|---|---|
| 3,610,276 A | * | 10/1971 | Seelman et al. | 137/469 |
| 5,199,856 A | * | 4/1993 | Epstein et al. | 137/565.34 |
| 5,873,388 A | * | 2/1999 | Carpenter | 137/624.15 |
| 5,941,267 A | * | 8/1999 | DeLand et al. | 137/15.09 |
| 6,247,903 B1 | | 6/2001 | Wong | |
| 6,557,822 B1 | | 5/2003 | Yoshino | |
| 7,222,636 B2 | | 5/2007 | Nguyen et al. | |
| 7,353,841 B2 | | 4/2008 | Kono et al. | |
| 7,537,194 B2 | | 5/2009 | Nagai | |

FOREIGN PATENT DOCUMENTS

KR    20010081556 A    8/2001

OTHER PUBLICATIONS

International Search Report and Written Opinion of the International Searching Authority mailed Jan. 14, 2010 in PCT/US2009/046639.

* cited by examiner

*Primary Examiner* — Kevin Lee
(74) *Attorney, Agent, or Firm* — Patterson & Sheridan, L.L.P.

(57) ABSTRACT

A method and apparatus are provided for a cost effective pressure dampening device used in a fluid delivery system for substrate processing. In one embodiment, the pressure dampening device is disposed between a mounting substrate and a control valve within a fluid control assembly in fluid communication with a substrate processing chamber. The pressure dampening device is capable of dampening small pressure perturbations in a process fluid which is used for substrate processing.

17 Claims, 12 Drawing Sheets

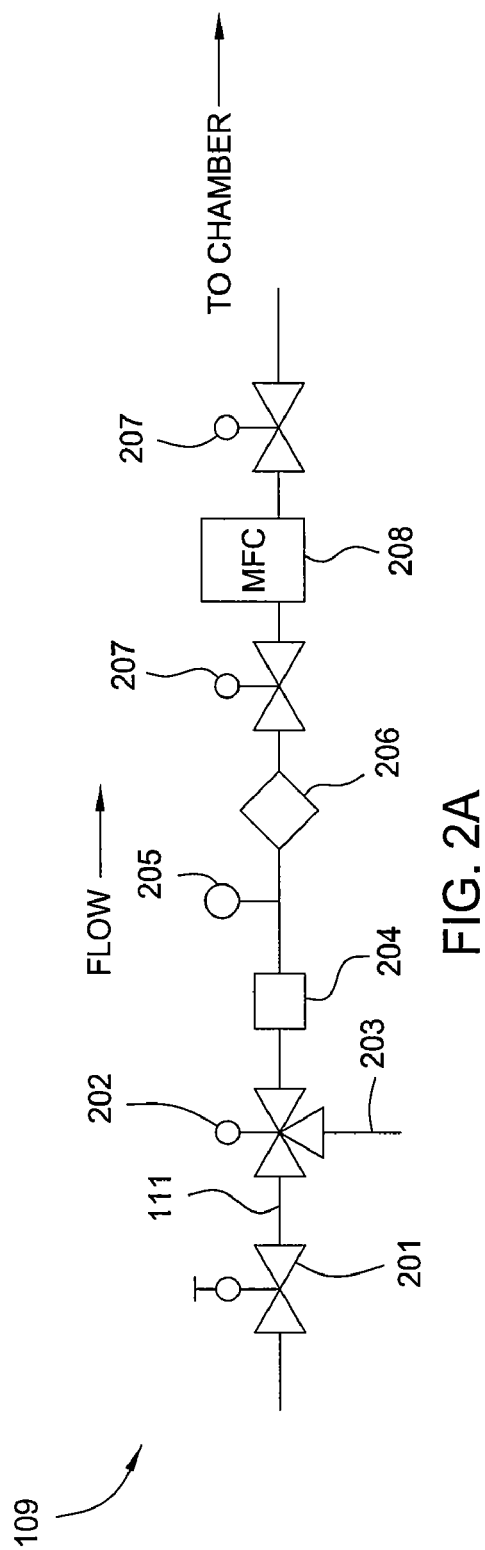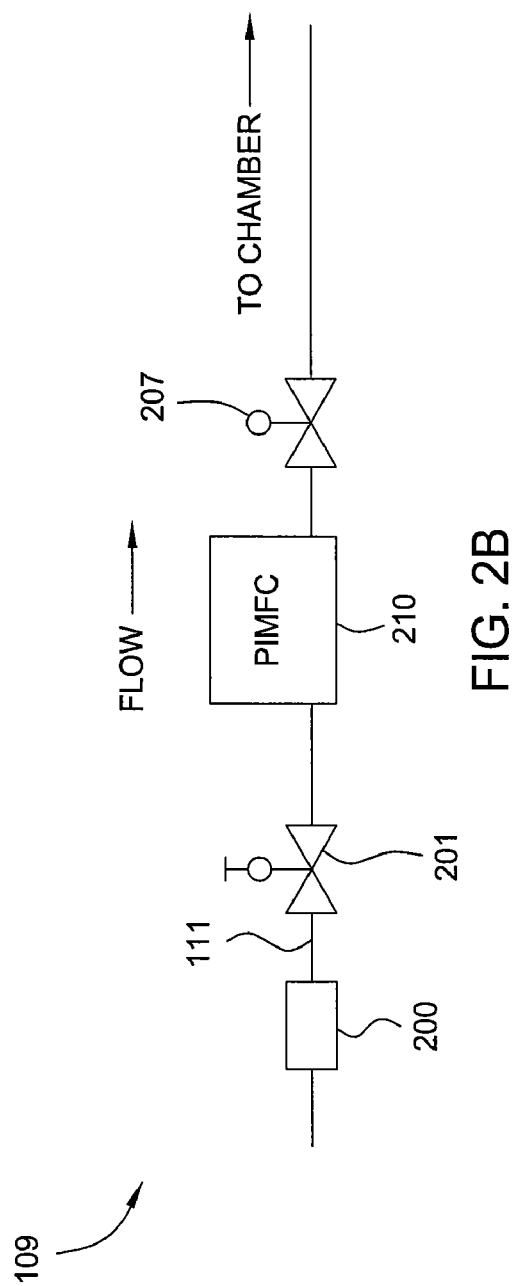
FIG. 2A
FIG. 2B

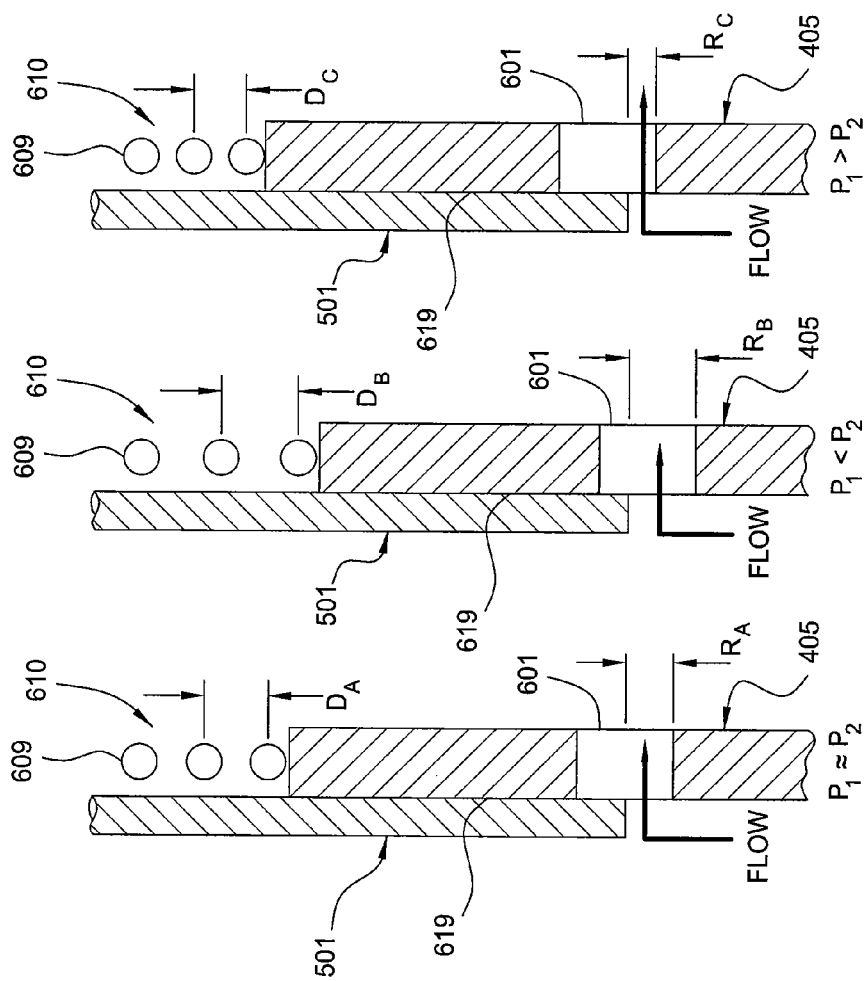

METHOD AND APPARATUS FOR DAMPENING PRESSURE FLUCTUATIONS IN A FLUID DELIVERY SYSTEM

BACKGROUND OF THE INVENTION

1. Field of the Invention

Embodiments of the present invention generally relate to a method and apparatus for controlling pressure in a fluid delivery system. More specifically, embodiments of the invention relate to a method and apparatus for dampening pressure fluctuations in a process fluid delivery system used for substrate processing.

2. Description of the Related Art

The need for greater process control continues to increase as semiconductor and electronics processing industries continue to strive for larger production yields and smaller device sizes. As a result, better control over substrate processing parameters and more precise methods of process endpoint detection are desirable. Additionally, the desire to reduce production costs creates a demand for a reduction in the cost of the substrate processing equipment that may provide improved process control.

Substrate processing typically requires many deposition and etching steps in order to fabricate an electronic device. The deposition and etching steps are performed in one or more substrate processing chambers which contain process fluids that act on the substrate, and precise control of the process fluid pressure, such as a process gas pressure, for example, is often required to achieve the desired processing result. Additionally, some endpoint detection methods may also require precise control of the process fluid pressure to reliably detect a processing endpoint.

One example of such an endpoint detection method is optical emission spectrometry (OES) which may be used to detect the endpoint of a deep trench plasma etch process. The trench depth combined with a narrow line width may make conventional etch endpoint detection methods (e.g., laser interferometry) unreliable, and deep trench etching applications typically require prompt cessation of the etching process once the desired depth has been achieved to avoid damage to a device feature or substrate support. The OES detector includes an optical sensor which provides spectroscopic information on the plasma chemistry which may change as the etching proceeds through different material layers. An etch endpoint is reached when a pre-determined change in plasma chemistry and associated spectral change is detected by the OES detector. However, the change in plasma chemistry may be so small that fluctuations in the process gas pressure within the processing chamber may mask the endpoint or falsely trigger an endpoint. Depending upon the application, acceptable variations in gas pressure may be limited to a few tenths (or less) of one psia (pounds per square inch absolute) in order for the OES detector to operate reliably.

Efforts to precisely control process fluid pressure and minimize pressure fluctuations have resulted in process fluid delivery systems which utilize pressure regulators and pressure insensitive mass flow controllers. Pressure regulators are often used to reduce the effects of pressure variations that may occur in a fluid delivery system due to cross talk, for example, which can result from single line drops within the system. However, pressure regulators are primarily used to step pressure up or down and have limited capability to dampen small pressure fluctuations since the regulating action of the regulator can produce small pressure fluctuations.

Pressure insensitive mass flow controllers (PIMFCs) have been developed which incorporate a pressure sensor in addition to the thermal flow sensor and control valve of a conventional mass flow controller (MFC). The pressure sensor is placed upstream of the thermal flow sensor and is part of the control loop which operates the control valve so that the PIMFC can quickly adjust the control valve to compensate for any for any changes in the inlet pressure detected by the pressure sensor. As a result, a PIMFC may effectively dampen pressure fluctuations down to a fairly small scale (e.g., 1-2 psia), but smaller pressure perturbations of a few tenths of one psia may pass through the PIMFC unaffected which may adversely affect substrate processing or endpoint detection.

Therefore, a need exists for a cost effective pressure dampening method and apparatus which can effectively dampen small pressure perturbations in a fluid delivery system.

SUMMARY OF THE INVENTION

Embodiments of the present invention provide a cost effective pressure dampening apparatus which can dampen small pressure perturbations in a fluid delivery system.

In one embodiment, a fluid control assembly comprises a mounting substrate, a fluid control element, and a pressure dampening device disposed between the mounting substrate and fluid control element, and the pressure dampening device allows continuous flow of a fluid through said device and dampens pressure perturbations in said fluid.

In another embodiment, a pressure dampening device comprises a housing which comprises a central inlet port and a peripheral outlet port disposed on a first surface of the housing, and a central outlet port and a peripheral inlet port disposed on a second, opposing surface of the housing, a movable member disposed within the housing, said member in contact with one or more springs, at least one spacer disposed between the movable member and housing, at least one opening formed in the movable member, and a first region separated from a second region by the movable member, the first region is in fluid communication with the central inlet port and the second region is in fluid communication with the central outlet port, wherein the opening has an area through which a fluid may flow from the first region to the second region, and the size of said area is determined by a fluid pressure in the first region and a fluid pressure in the second region, and wherein the pressure dampening device allows continuous flow of the fluid through said device.

In one embodiment, a method is provided for dampening pressure perturbations. The method comprises directing the fluid stream through a conduit which includes an inlet port, an outlet port, a movable element, and one or more springs in contact with the movable element, separating the fluid stream into a first region in fluid communication with the inlet port and a second region in fluid communication with the outlet port, wherein the first region is separated from the second region by the movable element, wherein the first region is in fluid communication with the second region through at least one opening in the movable element, and wherein the opening comprises an area through which the fluid may flow, and adjusting the size of the area to change the flow resistance between the first region and the second region so that the fluid pressure in the second region remains approximately constant, wherein adjusting the size of the area comprises displacing the movable element, and the movable element is displaced by the fluid pressures in the first and second regions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A is schematic view of an exemplary fluid control assembly.

FIG. 2B is schematic view of a fluid control assembly according to one embodiment of the invention.

FIG. 8A depicts a schematic detail view of the pressure dampening device shown in FIG. 6B when $P_1=P_2$ according to one embodiment of the invention.

FIG. 8B depicts a schematic detail view of the pressure dampening device shown in FIG. 6B when $P_1<P_2$ according to one embodiment of the invention.

FIG. 8C depicts a schematic detail view of the pressure dampening device shown in FIG. 6B when $P_1>P_2$ according to one embodiment of the invention.

To facilitate understanding, identical reference numerals have been used, where possible, to designate identical elements that are common to the figures. It is contemplated that features of one embodiment may be incorporated in other embodiments without further recitation.

DETAILED DESCRIPTION

The present invention generally provides a cost effective pressure dampening device capable of dampening small pressure fluctuations in a process fluid used for substrate processing.

Figure 1:
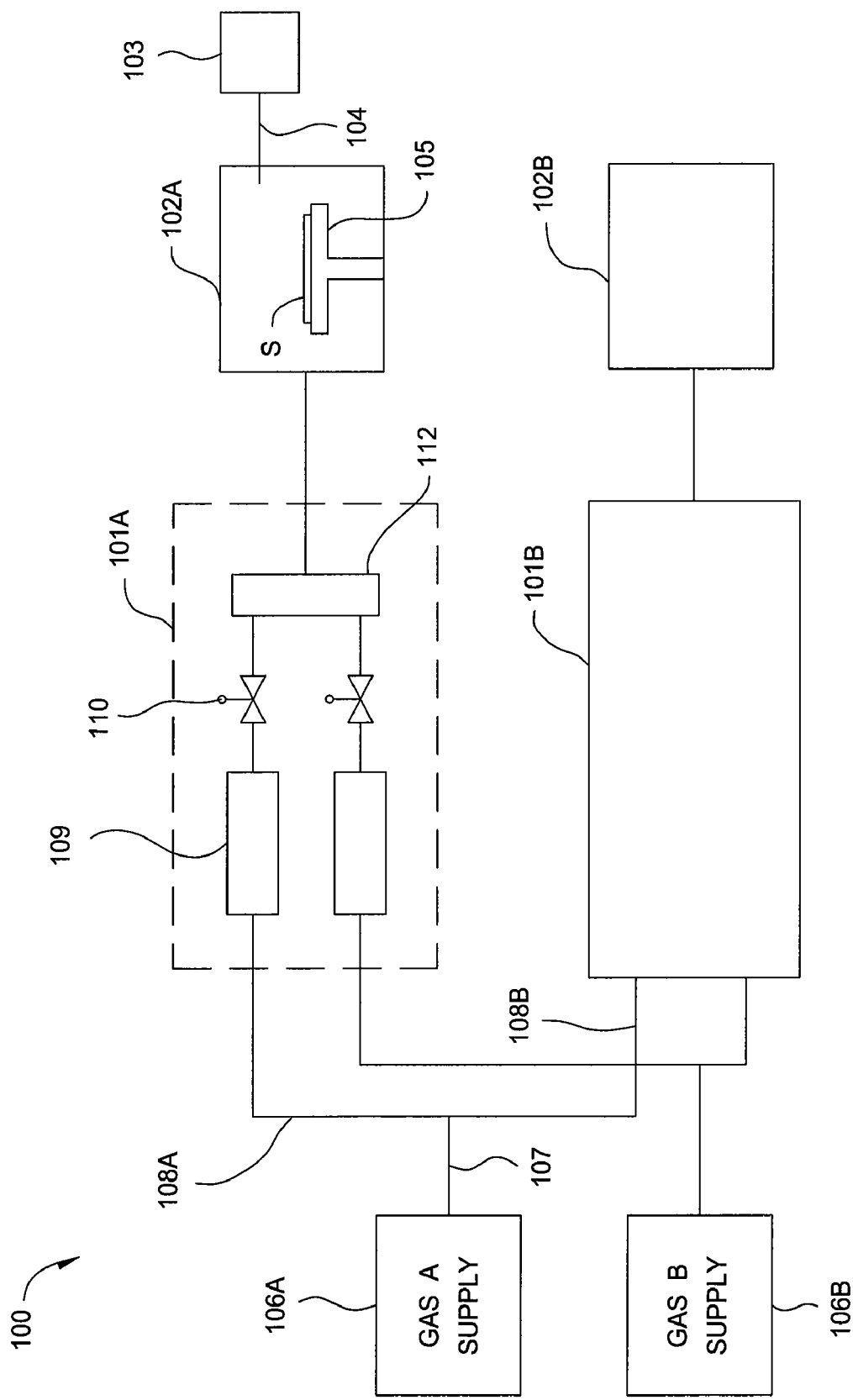
FIG. 1 is a simplified schematic of two substrate processing chambers and a fluid delivery system according to one embodiment of the invention.

FIG. 1 is a simplified schematic of two substrate processing chambers and a fluid delivery system 100 according to one embodiment of the invention. In the present embodiment, the fluid delivery system 100 is adapted to flow process fluids which comprise process gases. A first processing chamber 102A and a second processing chamber 102B are coupled to and in fluid communication with the fluid delivery system 100. In the present embodiment, the first processing chamber 102A comprises a plasma etch chamber. In another embodiment, the first processing chamber 102A may be configured to perform other types of substrate processing which include chemical vapor deposition (CVD), physical vapor deposition (PVD), or other types of substrate processing techniques. Vacuum pumping systems, plasma generating systems, and the like for controlling processes within the processing chamber are well-known and have been omitted for the sake of brevity.

The first processing chamber 102A includes a substrate support 105 which supports a substrate "S." The substrate support 105 may also include an electrostatic chuck for holding the substrate and heating elements for heating the substrate during substrate processing. In one embodiment, the first processing chamber 102A includes a processing endpoint detector 103 (e.g., optical emission spectrometry detector) which includes at least one sensor 104 (e.g., optical sensor) in fluid communication with the interior of the first processing chamber 102A. The second processing chamber 102B may be similar to first processing chamber 102A, or may be adapted to perform other types of substrate processing mentioned herein. The second processing chamber 102B may also include a processing endpoint detector 103.

The fluid delivery system 100 comprises a first fluid panel 101A, a second fluid panel 101B, a first gas supply 106A and a second gas supply 106B. Shut-off valves (not shown) are generally provided between the gas supplies and fluid panels. The first fluid panel 101A is coupled to and in fluid communication with first processing chamber 102A, and the second fluid panel 101B is coupled to and in fluid communication with the second processing chamber 102B. The first gas supply 106A and the second gas supply 106B are each coupled to and in fluid communication with the first fluid panel 101A and the second fluid panel 101B. The first gas supply 106A provides a process gas "A" which differs from a process gas "B" provided by the second gas supply 106B. The process gases "A" and "B" may comprise any gases needed for substrate processing, and may also include inert gases. The first fluid panel 101A may be similar or identical to the second fluid panel 101B. In another embodiment, the fluid delivery system 100 may comprise one or multiple fluid panels, with each fluid panel coupled to and in fluid communication with a processing chamber and one or more gas supplies.

The first fluid panel 101A comprises fluid control assemblies 109, a mixing manifold 112, and one or more pneumatic on/off valves 110 disposed between the fluid control assemblies 109 and mixing manifold 112. The first fluid panel 101A may comprise one or multiple fluid control assemblies 109. One of the fluid control assemblies 109 receives process gas "A" and a second fluid control assembly 109 receives process gas "B." Each pneumatic on/off valve 110 can be opened or closed from a remote location by an electronic signal which controls the supply of air or other gas to each valve. Thus, the flow of process gas between the fluid control assembly 109 and mixing manifold 112 can be turned on or off and the composition of the process gas which is delivered to the first processing chamber 102A can be controlled.

The first gas supply 106A can supply process gas "A" to a fluid control assembly 109 in the first fluid panel 101A through a first supply line 108A, and a second supply line 108B allows process gas "A" to be delivered to a second fluid control assembly 109 in the second fluid panel 101B. Note that the first supply line 108A and second supply line 108B branch from a single, primary line 107. Such a "single line drop" can introduce cross talk between the supply lines and create pressure fluctuations within the lines. For example, the first supply line 108A may be flowing process gas "A" to the first fluid panel 101A at a flow rate of about 100 sccms (standard cubic centimeters per minute). The flow of process gas "A" to the second fluid panel 101B may then suddenly be turned on at approximately the same flow rate, resulting in a pressure drop in the first supply line 108A which may last for one or two seconds as gas begins to flow through the second supply line 108B. The momentary drop in pressure can produce a pressure perturbation in the first supply line 108A which may range in magnitude from about 1 psia to about 3 psia (pounds per square inch absolute), for example. However, the magnitude of the pressure perturbation may increase as the flow rates increase and as the difference in flow rates between supply lines increases.

FIG. 2A is schematic view of an exemplary fluid control assembly 109. A series of fluid control elements are coupled together to form the fluid control assembly 109. As defined herein, the "fluid control elements" may include passive elements (e.g., fluid sensors/transducers, filters, etc.) as well as active control elements (e.g., valves, regulators, MFCs, etc.). Process gas can flow in the direction indicated through conduits 111 which are coupled to and in fluid communication with the fluid control elements. The conduits 111 may comprise tubes or channels which form fluid delivery lines or part of the fluid control elements and mounting substrates. The fluid control assembly 109 comprises a hybrid on/off valve 201 which is a combination pneumatic/manual valve which can be opened remotely only when the valve is manually enabled. The valve remains closed if manually disabled even when a pneumatic opening signal is present, and this feature provides a safety interlock during servicing and maintenance. A fluid control assembly 109 which includes a pneumatic/manual valve is described in U.S. Patent Application Publication 2005/0000570, filed on Jan. 16, 2004, which is incorporated herein by reference in its entirety.

A purge valve 202 is connected to a purge gas (e.g., nitrogen) supply line 203 to allow purging of the fluid control assembly 109, which may be desirable if the process gas is a toxic and/or corrosive gas. Gas pressure is controlled by a pressure regulator 204 and a pressure transducer 205. A fluid filter 206 is provided to remove impurities from the gas stream. A conventional mass flow controller (MFC) 208 allows precise control of gas flow through the fluid control assembly 109, and a pneumatic on/off valve 207 is disposed to each side of the mass flow controller 208 so that the mass flow controller 208 may be purged for maintenance. The MFC 208 can be remotely controlled to adjust the flow rate of gas through the fluid control assembly 109.

FIG. 2B is schematic view of a fluid control assembly 109 according to one embodiment of the invention. The fluid control assembly 109 comprises a pressure dampening device 200, hybrid on/off valve 201, a pressure insensitive mass flow controller (PIMFC) 210, and pneumatic on/off valve 207. The PIMFC may include a filter in addition to the pressure sensor described herein. The use of a PIMFC allows the removal of several fluid control elements from the fluid control assembly 109 since the PIMFC combines into a single unit the functionalities of the pressure regulator 204, pressure transducer 205, fluid filter 206, and MFC 208. The reduction in the number of fluid control elements helps reduce the cost, complexity, and space requirements for the fluid control assembly 109. In another embodiment, the fluid control assembly 109 shown in FIG. 2B may also include one or more fluid control elements shown in FIG. 2A. The fluid control assembly 109 of the present invention may comprise fluid control elements which include but are not limited to the elements shown in FIGS. 2A and 2B and described herein (e.g., hybrid on/off valve 201, pressure regulator 204, PIMFC 210, and so on).

Figure 3:
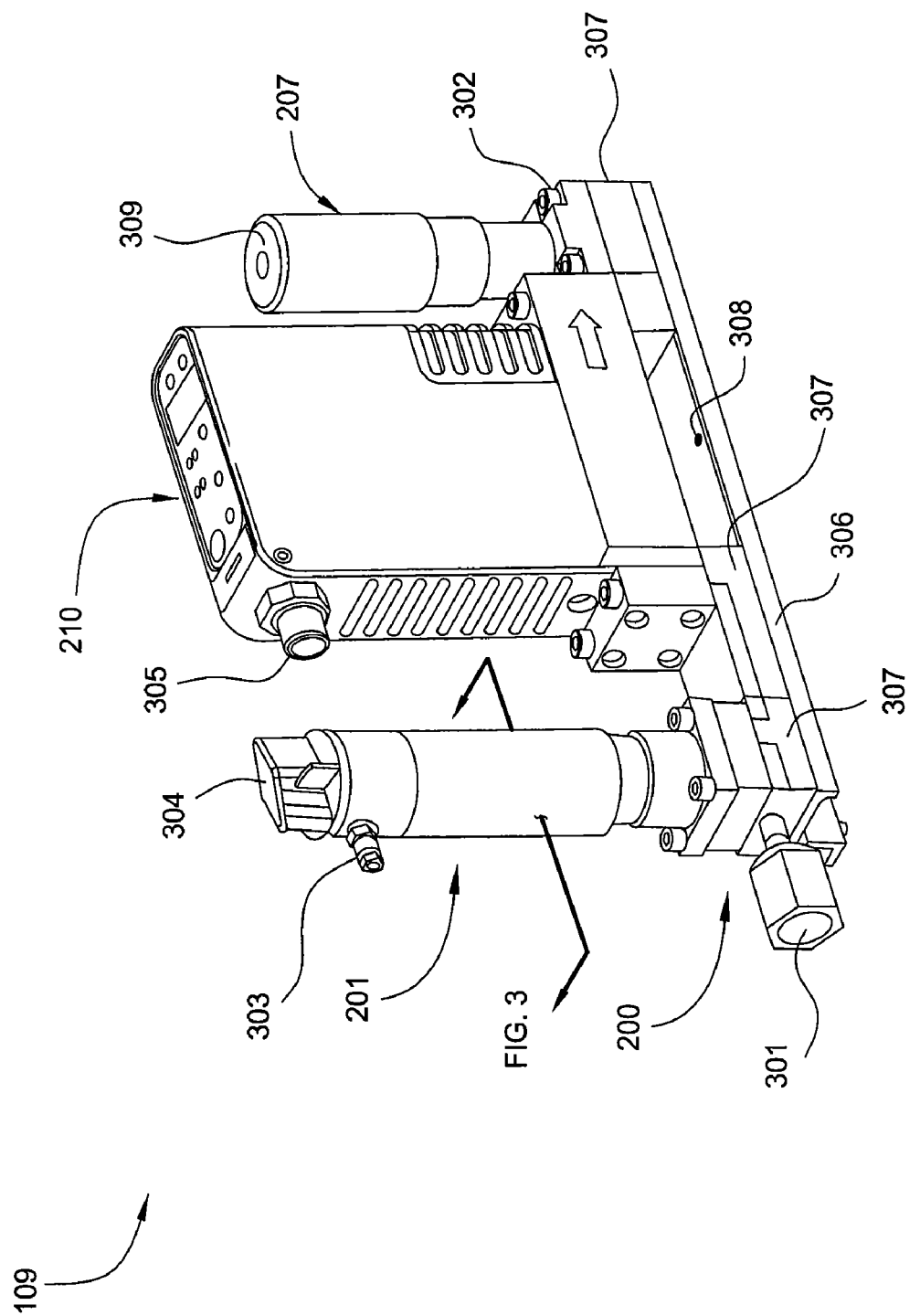
FIG. 3 is a perspective view of a fluid control assembly shown in FIG. 2B according to one embodiment of the invention.

FIG. 3 is a perspective view of a fluid control assembly 109 shown in FIG. 2B according to one embodiment of the invention. The fluid control assembly 109 comprises a surface mount configuration which includes a support plate 306 having a mounting surface 308 for receiving a plurality of mounting substrates 307 to which are mounted various fluid control elements. The mounting substrates 307 include conduits 111 which comprise inlet conduits 211A and outlet conduits 211B (see FIG. 4) which allow the process gas to flow through the fluid control assembly 109. A coupling fitting 301 is attached to one of the mounting substrates 307 and allows a gas line (not shown) to be coupled to the mounting substrate 307. Similar coupling fittings 301 may also be disposed on other mounting substrates 307. Fasteners 302 (e.g., screws) may be used to couple the fluid control elements to the mounting substrates 307 and the mounting substrates 307 to the support plate 306. Sealing elements (not shown) may be disposed between mounting substrates 307 and fluid control elements to provide fluid seals. The surface mount configuration facilitates fluid control element servicing and reduces the space required for the fluid control assembly 109.

The pressure dampening device 200 is disposed between the mounting substrate 307 and the hybrid on/off valve 201. This "sandwich style" configuration for the pressure dampening device 200 allows the device to be installed between other components and minimizes the space needed for the device within the fluid control assembly 109. The hybrid on/off valve 201 includes a pneumatic port 303 for remote operation of the valve and a knob 304 to manually enable or disable remote opening of the valve. The PIMFC 210 and pneumatic on/off valve 207 are coupled to mounting substrates 307 downstream of the hybrid on/off valve 201. The PIMFC 210 includes a communications port 305 which allows remote monitoring and control of the PIMFC 210, and the pneumatic on/off valve 207 includes a pneumatic port 309 for remote opening and closing of the valve. In another embodiment, the pressure dampening device 200 may be disposed between any two fluid control elements or fluid control element and mounting substrate 307 in the fluid control assembly 109.

Figure 4:
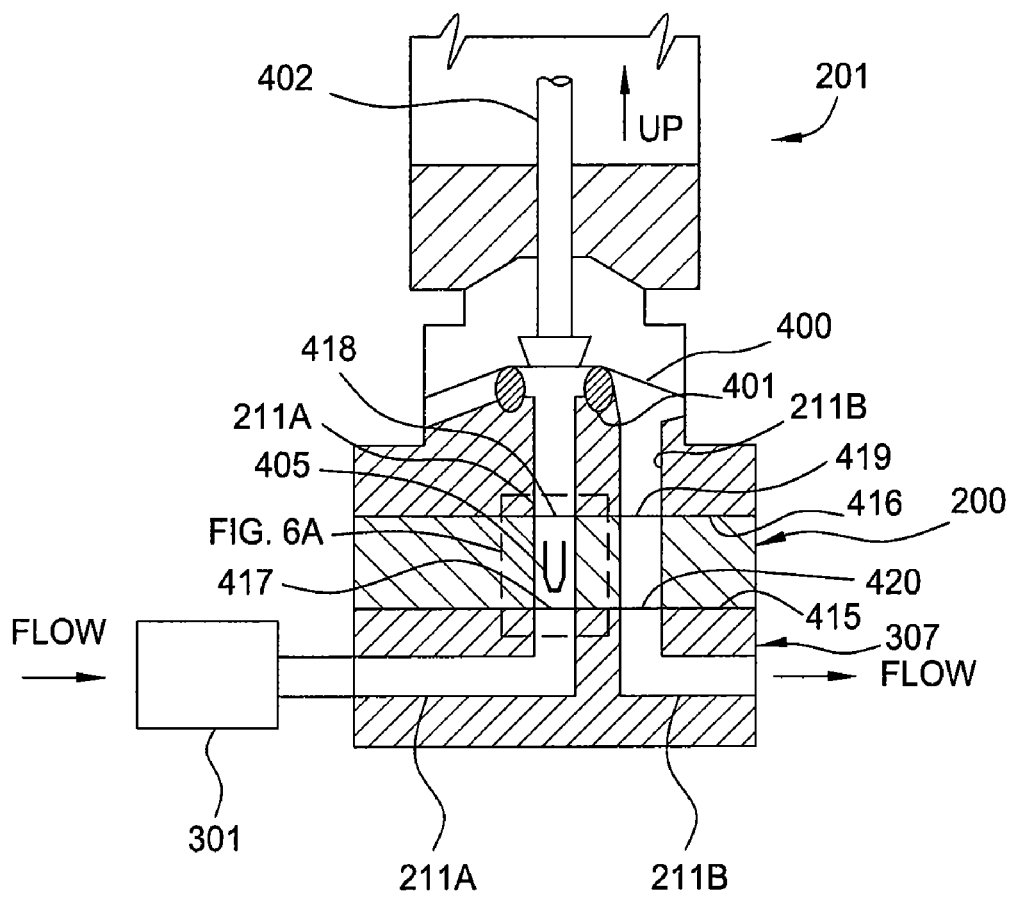
FIG. 4 is a schematic cross-sectional view of the fluid control assembly shown in FIG. 3 according to one embodiment of the invention.

FIG. 4 is a schematic cross-sectional view of the fluid control assembly 109 shown in FIG. 3 according to one embodiment of the invention. Inlet conduits 211A and outlet conduits 211B are formed in the mounting substrate 307, pressure dampening device 200, and hybrid on/off valve 201 so that when these elements are assembled continuous flow channels are formed. The inlet conduits 211A provide a flow path for the process gas from the mounting substrate 307 to the fluid control element, and the outlet conduits 211B provide a flow path from the fluid control element to the mounting substrate 307. Sealing elements (not shown) are provided at the conduit interfaces to form gas-tight seals between components.

The pressure dampening device 200 includes a first mounting surface 415 in contact with the mounting substrate 307, and a second mounting surface 416 in contact with the hybrid on/off valve 201. The pressure dampening device 200 also includes a central inlet port 417 disposed on the first mounting surface 415 and a central outlet port 418 disposed on the second mounting surface 416, and the central ports are formed at opposite ends of an inlet conduit 211A formed in the pressure dampening device 200. A peripheral inlet port 419 is disposed on the second mounting surface 416 and a peripheral outlet port 420 is disposed on the first mounting surface 415, and the peripheral ports are formed at opposite ends of an outlet conduit 211B formed in the pressure dampening device 200. The pressure dampening device 200 also includes a movable member 405 described in detail below.

The hybrid on/off valve 201 includes seating surface 401, diaphragm 400, actuator 402, and conduits 211 which include an inlet conduit 411A and outlet conduit 411B. Additional components of the hybrid on/off valve 201 have been omitted for clarity. The hybrid on/off valve 201 is shown in a closed or off position so that no gas can flow through the valve. The diaphragm 400 is forced against seating surface 401 by actuator 402 so that the inlet conduit 211A and outlet conduit 211B are not in fluid communication. When the hybrid on/off valve 201 is opened or turned on, the actuator 402 moves in the "UP" direction and the resilient diaphragm 400 flexes upward and off of the seating surface 401 so that the inlet conduit 211A is in fluid communication with the outlet conduit 211B and process gas can flow through the fluid control assembly 109.

Figure 5A:
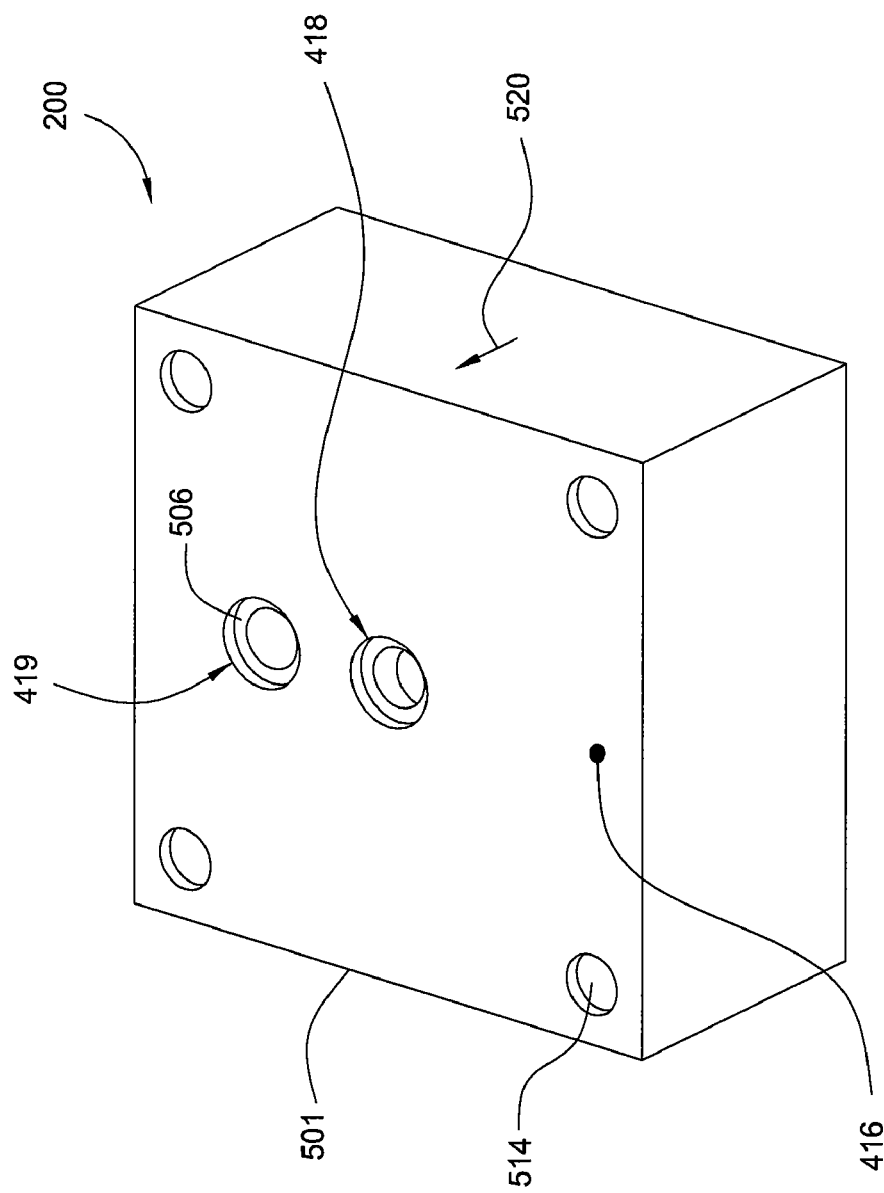
FIG. 5A is a perspective view of the pressure dampening device shown in FIG. 4 according to one embodiment of the invention.

FIG. 5A is a perspective view of the pressure dampening device 200 shown in FIG. 4 according to one embodiment of the invention. The pressure dampening device 200 includes a housing 501 which may comprise a stainless steel block. In one embodiment, the volume of the housing 501 (or block "envelope") may range from about 0.3 cubic inches to about 2.2 cubic inches. Materials other than stainless steel may also be used for the housing 501. The housing 501 may also be treated (e.g., electro-polished) to inhibit corrosion and/or help prevent contamination of the process fluid. The thru-holes 514 receive fasteners 302 and allow the pressure dampening device 200 to be coupled to mounting substrate 307 and hybrid on/off valve 201. Each of the central inlet/outlet ports 417/418 and peripheral inlet/outlet ports 419/420 may also include a seating surface 506 which receives a sealing element (not shown), such as an o-ring, for example, and the ports may all be similar or identical in design. The flow arrow 520 indicates the direction of gas flow through the inlet conduit 211A which connects the central inlet port 417 to the central outlet port 418.

Figure 5B:
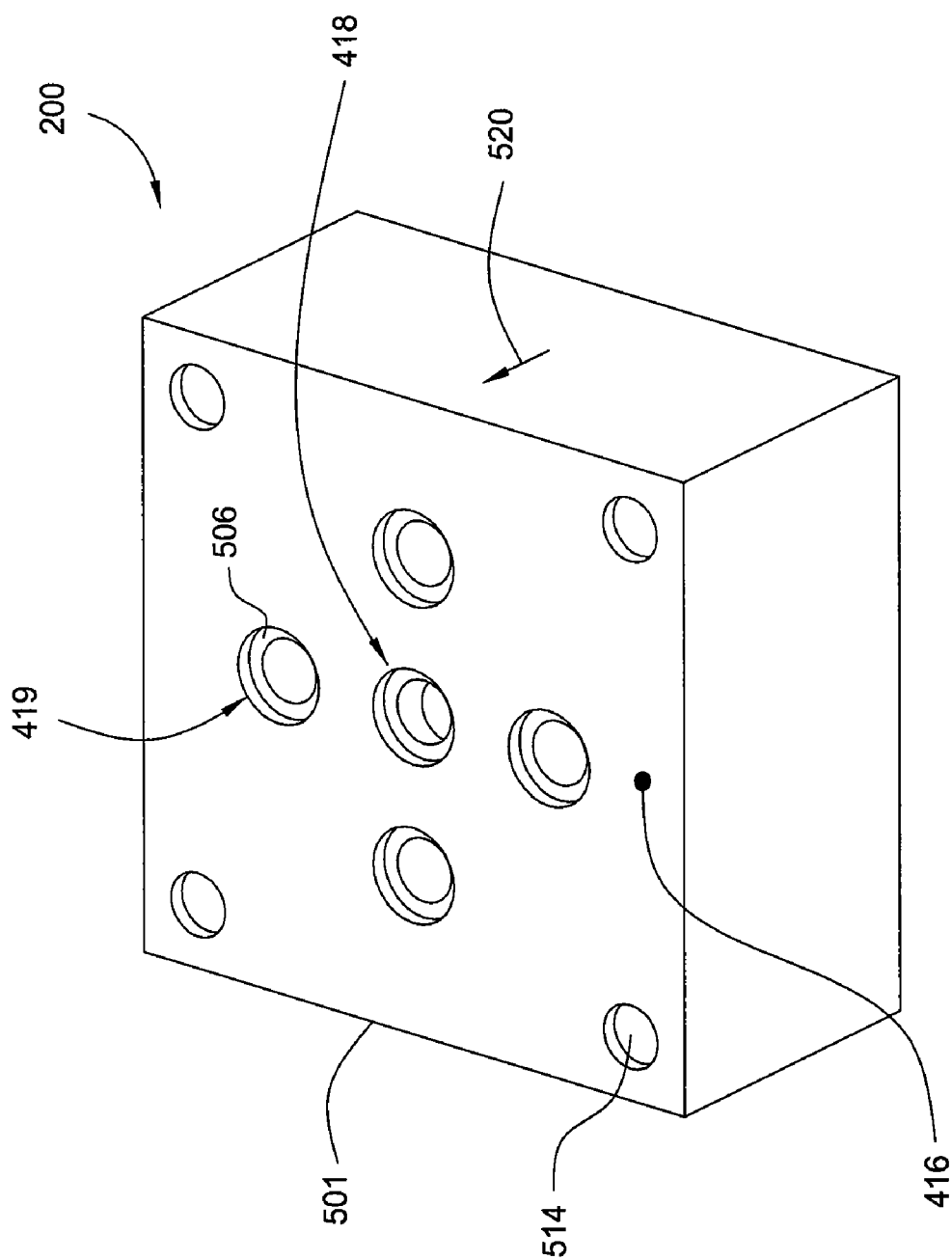
FIG. 5B is a perspective view of the pressure dampening device shown in FIG. 5A according to another embodiment of the invention.

FIG. 5B is a perspective view of the pressure dampening device 200 shown in FIG. 5A according to another embodiment of the invention. The pressure dampening device 200 may include a plurality of peripheral inlet ports 419 and a plurality of corresponding peripheral: outlet ports 420 which facilitate device alignment and enable the required flow routing for a fluid control element.

Figure 6A:
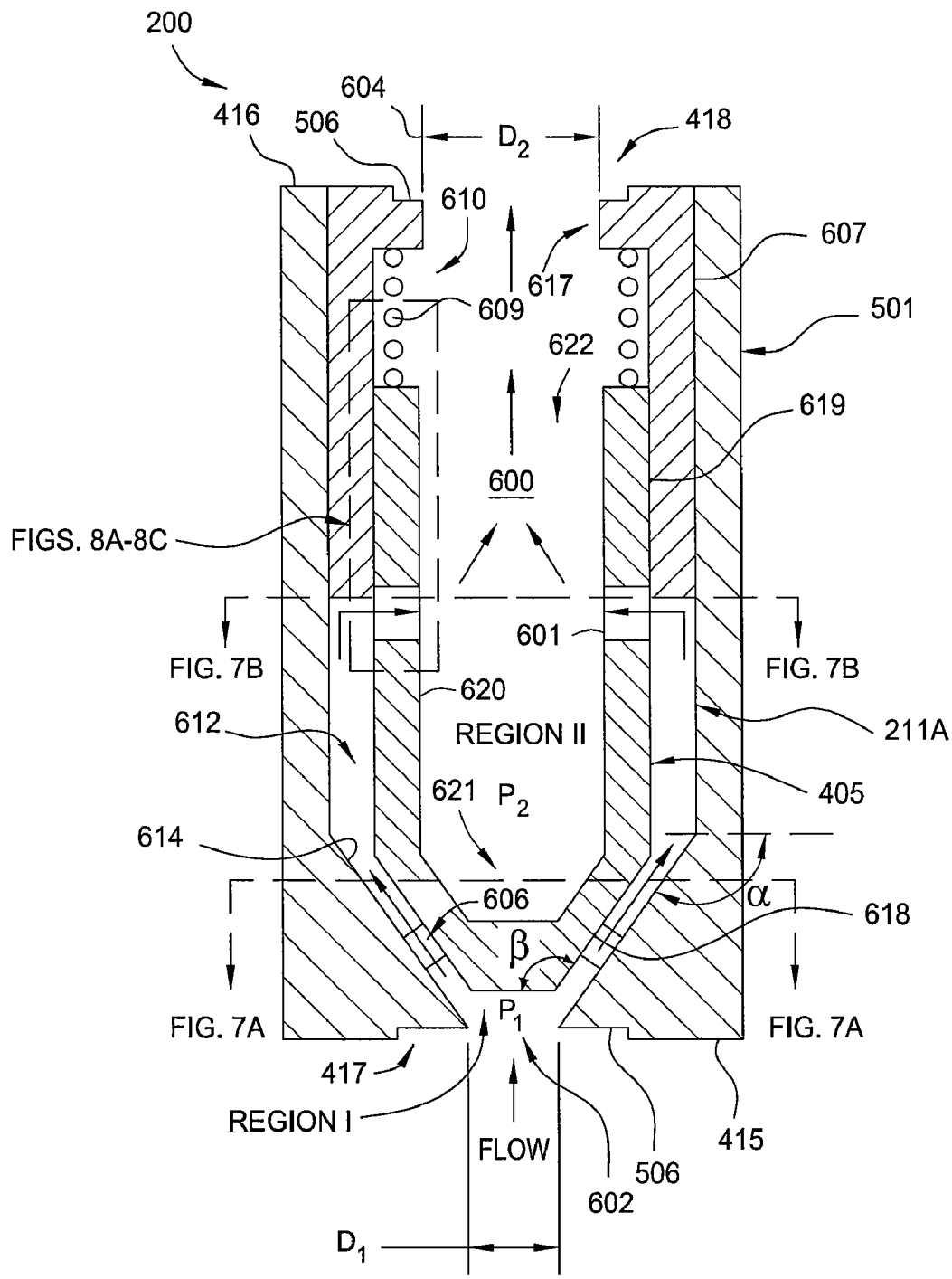
FIG. 6A is a schematic cross-sectional detail view of a pressure dampening device shown in FIG. 4 according to one embodiment of the invention.

FIG. 6A is a schematic cross-sectional detail view of a pressure dampening 200 device shown in FIG. 4 according to one embodiment of the invention. The pressure dampening device 200 comprises an inlet aperture 602, an outlet aperture 604, one or more springs 610, spacers 606, and movable member 405. The inlet aperture 602 forms part of the central inlet port 417 and has a diameter $D_1$, and the outlet aperture 604 forms part of the central outlet port 418 and has a diameter $D_2$. In one embodiment, the diameter $D_1$ is approximately equal to the diameter $D_2$. In another embodiment, the inlet aperture 602 and/or outlet aperture 604 are non-circular in shape and have approximately the same areas.

The inlet aperture 602 and outlet aperture 604 comprise openings which form part of a thru-hole 600 formed in the housing 501. The surfaces of the housing 501 which bound the thru-hole 600 comprise the inlet conduit 211A formed in the pressure dampening device 200. The housing 501 comprises tapered surfaces 614 formed near the inlet aperture 602 and the tapered surfaces 614 have a taper angle α. In one embodiment, the tapered surfaces 614 comprise a conical surface.

Disposed within the housing 501 is the movable member 405 which is in contact with the one or more springs 610 having spring cross-sections 609. The one or more springs 610 are also in contact with one or more projecting features 617 which retain the one or more springs 610, although other retaining means may be contemplated. In one embodiment, the one or more projecting features 617 form part of an insert 607. The insert 607 allows movable member 405 and the one or more springs 610 to be assembled into the housing 501 and then retained by press fitting the insert 607 into the housing 501. In another embodiment, the insert 607 may be bonded to the housing 501.

The one or more springs 610 provide an elastic force which urges the movable member 405 towards the inlet aperture 602. The movable member 405 is free to slide along contact surfaces 619 and the displacement of the movable member 405 is limited by spacers 606 disposed near the tapered surfaces 614. In one embodiment, the spacers 606 are coupled to the tapered surfaces 614 and the spacers 606 provide seating surfaces 618 for the movable member 405. FIG. 6A shows the movable member 405 in contact with spacers 606. The spacers 606 prevent the movable member 405 from blocking the inlet aperture 602 and closing off fluid flow through the pressure dampening device 200.

In one embodiment, the one or more springs 610 comprise a wave spring (e.g., single-turn, nested, crest-to-crest). Preferably, the one or more springs 610 provide symmetric loading for movable member 405. In another embodiment, the one or more springs 610 comprise a helical coil spring, and spring cross-sections 609 represent coils of the spring 610. In general, the springs 610 may comprise any elastic device or devices which provide the desired spring constants and loading for the movable member 405. In one embodiment, the one or more springs 610 comprise a corrosion-resistant material (e.g., stainless steel). The one or more springs 610 may also be treated (e.g., electro-polished) to help prevent contamination of the process gas.

The movable member 405 comprises a hollowed, elongated solid having member walls 620 with one or more openings 601 that are formed in and through the member walls 620. Two openings 601 are shown in FIG. 6A. The member walls 620 form a closed end 621 near the inlet aperture 602 and an open end 622 near the outlet aperture 604. The movable member 405 is tapered at closed end 621 with a taper angle β. In one embodiment, the taper angle α is approximately equal to taper angle β. In one embodiment, the movable member 405 comprises a hollow cylinder which is tapered at closed end 621. The one or more openings 601 may comprise circular holes, slots, or other shaped openings to provide the desired flow characteristics without adversely affecting the structural strength of the movable member 405. The housing 501, movable member 405, and spacers 606 are suitably adapted to provide peripheral channels 612 which allow process gas to flow from inlet aperture 602 to the one or more openings 601.

A Region I is disposed outside the movable member 405 at the closed end 621 and includes the inlet aperture 602. Region I is separated by member walls 620 from a Region II which is partially enclosed by the member walls 620, and Region II is in fluid communication with outlet aperture 604. Region I contains gas at a pressure $P_1$ and Region II contains gas at a pressure $P_2$. The openings 601 provide a means for fluid communication between Region I and Region II. In one embodiment, process gas enters the inlet aperture 602 at pressure $P_1$ and exits the outlet aperture 604 at pressure $P_2$.

Figure 6B:
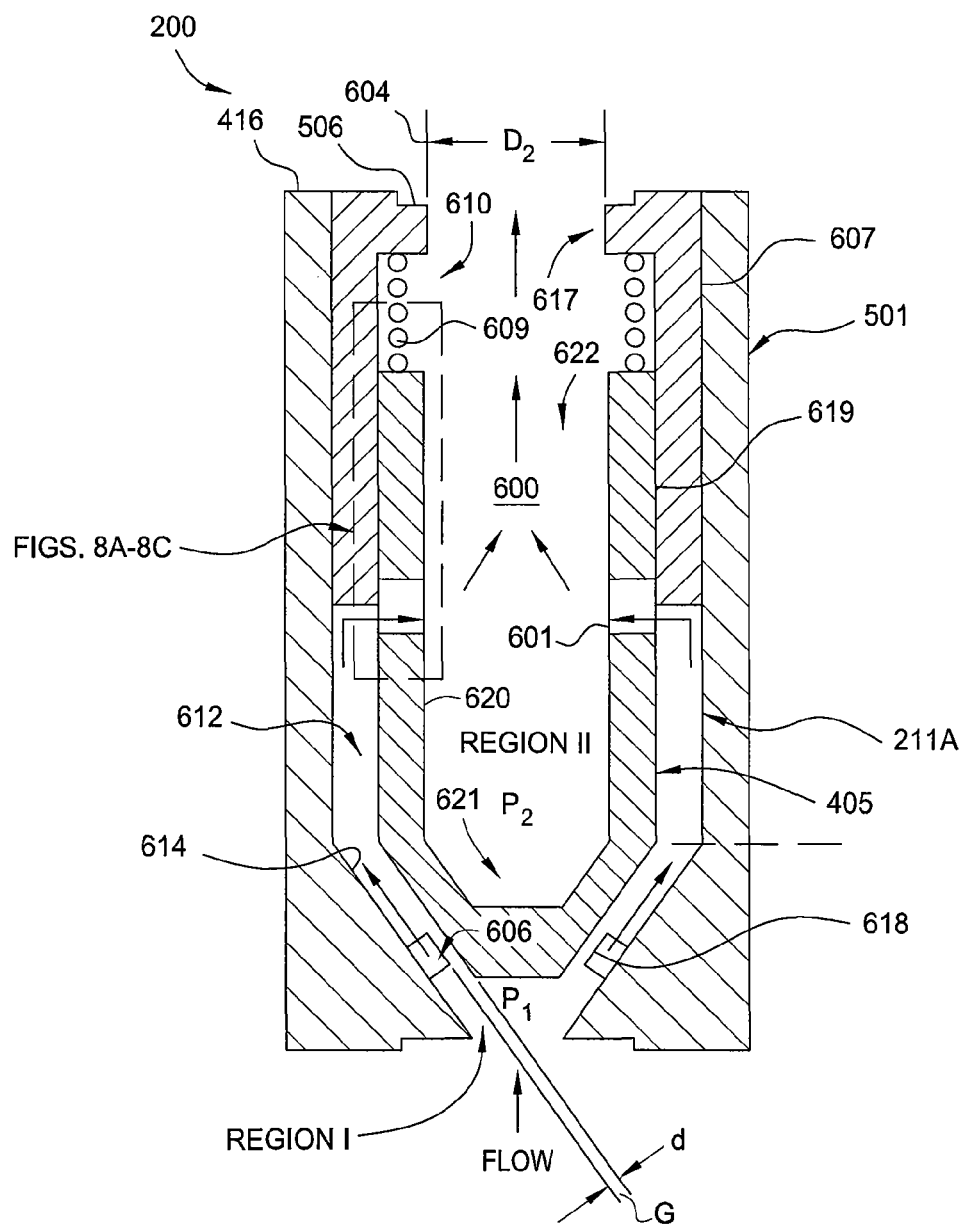
FIG. 6B is a schematic view of the pressure dampening device shown in FIG. 6A according to one embodiment of the invention.

FIG. 6B is a schematic view of the pressure dampening device 200 shown in FIG. 6A according to one embodiment of the invention. The movable member 405 may be moved out of contact with spacers 606 and away from inlet aperture 602 by applying a sufficient force on the movable member 405. The applied force, which opposes the elastic force provided by the one or more springs 610, may displace the movable member 405 until all forces acting on the movable member 405 are balanced, resulting in a gap "G" having a gap distance "d" between the seating surfaces 618 and movable member 405. The displacement of the movable member 405 is limited by the projecting features 617 and compression of the one or more springs 610.

Figure 7A:
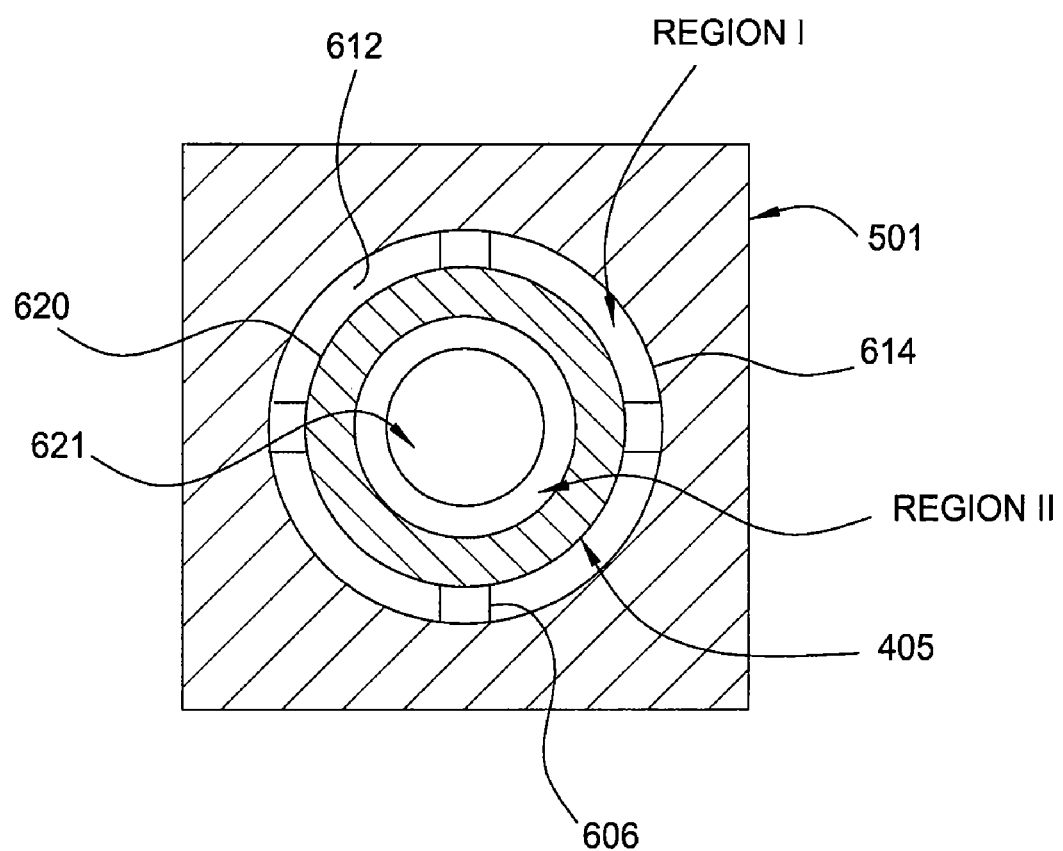
FIG. 7A is a schematic cross-sectional view of the pressure dampening device shown in FIG. 6A according to one embodiment of the invention.

FIG. 7A is a schematic cross-sectional view of the pressure dampening device 200 shown in FIG. 6A according to one embodiment of the invention. The movable member 405 is a hollow cylinder and has a circular member wall 620 and closed end 621 (looking towards inlet aperture 602). The member wall 620 surrounds Region II and separates said region from Region I. The movable member 405 is seated upon spacers 606 which are disposed on tapered surface 614 which comprises a conical surface. Although only four spacers 606 are shown, any number of spacers 606 may be used. The peripheral channels 612 are disposed between the tapered surface 614 and movable member 405, and spacers 606 prevent the movable member 405 from closing off flow at the inlet aperture 602.

Figure 7B:
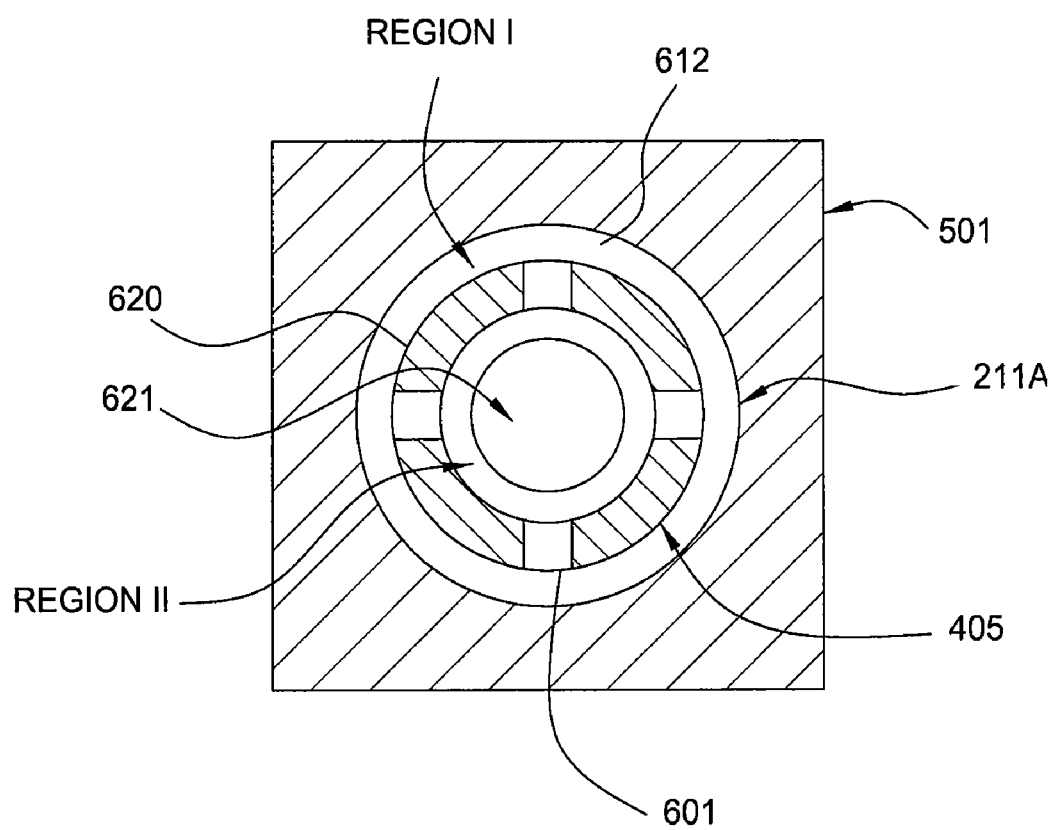
FIG. 7B is another schematic cross-sectional view of the pressure dampening device shown in FIG. 6A according to one embodiment of the invention.

FIG. 7B is another schematic cross-sectional view of the pressure dampening device 200 shown in FIG. 6A according to one embodiment of the invention. Four openings 601 are formed within the member wall 620 and allow fluid communication between Region I and Region II, although any number of openings 601 may be formed in the member wall 620.

Referring to FIGS. 6A and 6B, the pressure dampening device 200 is adapted to dampen pressure perturbations in the process gas which is used for substrate processing. In the absence of pressure perturbations or changes in pressure setpoints, the pressures $P_1$ and $P_2$ may be approximately constant over time resulting in a steady state as process gas flows through the pressure dampening device 200. The pressures $P_1$ and $P_2$ may be approximately equal in the steady state, but $P_1$ may be slightly greater than $P_2$ due to any flow resistance which exists within the pressure dampening device 200. In one embodiment, the steady-state pressure difference between pressure $P_1$ and pressure $P_2$ is approximately equal to or less than about 5 psia. In another embodiment, the steady-state pressure difference between pressure $P_1$ and pressure $P_2$ ranges from about 1 psia to about 3 psia. In yet another embodiment, the steady-state pressure difference between pressure $P_1$ and pressure $P_2$ is preferably less than or equal to about 1 psia. In one embodiment, the pressure dampening device 200 has a volumetric flow coefficient ($C_V$) that is approximately equal to or greater than 0.3 in the steady state.

Process gas (see flow arrows) enters inlet aperture 602 and flows through peripheral channels 612. The pressure $P_1$ in Region I exerts a force on the movable member 405 in the direction of the outlet aperture 604. The one or more springs 610 and pressure $P_2$ in Region II exert forces in the opposite direction (towards inlet aperture 602) on the movable member 405. Additionally, frictional forces at the contact surfaces 619 may also act on the movable member 405. A balance of forces determines the final displacement and gap distance "d" of the movable member 405 from the spacers 606. In one embodiment, the movable member 405 is slightly displaced from the spacers 606 in the steady state, as shown in FIG. 6B.

FIG. 8A depicts a schematic detail view of the pressure dampening device 200 shown in FIG. 6B when $P_1 \approx P_2$ according to one embodiment of the invention. In the steady state, the pressures $P_1$ and $P_2$ are approximately constant and approximately equal and each opening 601 is partially blocked by housing 501, leaving an area $R_A$ which is unblocked by housing 501. The spring cross-sections 609 are separated by a distance $D_A$ which may represent a compressed state for the one or more springs 610. Process gas flows from inlet aperture 602 in Region I into peripheral channels 612, and then into the area $R_A$ of each opening 601 and into Region II to outlet aperture 604. The spring constants of the one or more springs 610 and the sizes of openings 601 are suitably selected so that the combined areas $R_A$ for all openings 601 produce a desired $C_V$ value for the pressure dampening device 200. The $C_V$ value is the total value of the volumetric flow coefficient for the pressure dampening device 200 and depends on the total unblocked area for all openings 601 and other geometrical features of the flow path within the pressure dampening device 200. In one embodiment, $C_V$ is approximately equal to or greater than 0.3 when $P_1$ is approximately equal to $P_2$.

FIG. 8B depicts a schematic detail view of the pressure dampening device 200 shown in FIG. 6B when $P_1 < P_2$ according to one embodiment of the invention. In the presence of a pressure perturbation, the pressure $P_1$ may suddenly drop from a steady state value so that $P_1 < P_2$ over a short time interval, and then the pressure $P_1$ may return to a steady state value. The pressure perturbation is a transient pressure change which may last from a fraction of a second to a few seconds. The pressure perturbation may occur due to cross talk which can cause a pressure drop in a gas line, as described herein. The pressure change $\Delta P_1$ is the magnitude of the maximum change in pressure $P_1$ which occurs during the pressure perturbation, and the pressure change $\Delta P_2$ is the magnitude of the maximum change in pressure $P_2$ during the pressure perturbation. It is desirable to minimize pressure perturbations in the process gas to avoid adversely affecting substrate processing and/or endpoint detection, and so it is desirable to minimize the pressure change $\Delta P_2$ in Region II which is in fluid communication with the processing chamber 102A. By minimizing the pressure change $\Delta P_2$, the pressure $P_2$ may remain approximately constant.

The drop in pressure $P_1$ may cause unbalanced forces to act on the movable member 405. The unbalanced forces cause the movable member 405 to move towards the spacers 606 so that gap distance "d" decreases and the housing 501 blocks less of the opening 601, producing an area $R_B$ which is greater than area $R_A$. The one or more springs 610 may also relax slightly so that the distance $D_B$ is greater than the distance $D_A$. The increased area $R_B$ decreases the resistance to flow from Region I to Region II. In one embodiment, $C_V$ is greater than about 0.3 for the pressure dampening device 200 when $P_1 < P_2$.

The ideal gas law, PV=nRT, states that the pressure P is proportional to the amount of gas n (the number of moles) when the volume V and temperature T are constant (R is the universal gas constant). When pressure perturbations occur, the volumes of Region I and Region II and the process gas temperature may be approximated as constant, and so as pressure $P_1$ decreases, the amount of gas in Region I will also decrease. The pressure $P_2$ may be kept approximately constant by minimizing the change in the amount of gas in Region II, and the larger areas $R_B$ reduce the resistance to flow from Region I to Region II so that the amount of gas in Region II may remain fairly constant as pressure $P_1$ drops. Thus, the displacement of the movable member 405 as pressure $P_1$ decreases may keep pressure $P_2$ approximately constant and thereby dampen the pressure perturbation. The dampening of pressure perturbations may be expressed as a pressure change ratio, $\rho = \Delta P_2 / \Delta P_1$. In one embodiment, the pressure change $\Delta P_1$ may range from about 0.5 psia to about 5 psia. In one embodiment, the pressure change ratio ρ ranges from about 0.01 to about 1. In another embodiment, the pressure change $\Delta P_2$ is less than or equal to about 0.1 psia.

FIG. 8C depicts a schematic detail view of the pressure dampening device 200 shown in FIG. 6B when $P_1>P_2$ according to one embodiment of the invention. A pressure perturbation in Region I may suddenly cause pressure $P_1$ to increase and depart from a steady state value so that $P_1>P_2$ over a short time interval. The sudden increase in pressure $P_1$ causes unbalanced forces to act on the movable member 405 so that the movable member 405 may move away from the spacers 606 and the gap distance "d" increases. The one or more springs 610 may be further compressed so that $D_C<D_A$ as pressure $P_1$ increases. As a result, the housing 501 blocks more of the opening 601 so that area $R_C$ is less than area $R_A$ and the smaller area $R_C$ increases the flow resistance from Region I to Region II. In one embodiment, $C_V$ is less than about 0.3 for the pressure dampening device 200 when $P_1>P_2$. The increased flow resistance through openings 601 may compensate for the increase in pressure $P_1$ so that the amount of gas in Region II does not increase and pressure $P_2$ remains approximately constant during the pressure perturbation. In one embodiment, the pressure dampening device 200 is suitably adapted to maintain a non-zero value for the area $R_C$ so that flow is not shut off when $P_1>P_2$. In another embodiment, the pressure dampening device 200 is suitably adapted to remain open and allow continuous fluid flow through said device for all pressures $P_1$ and $P_2$.

FIG. 8C depicts a schematic detail view of the pressure dampening device 200 shown in FIG. 6B when $P_1>P_2$ according to one embodiment of the invention. A pressure perturbation in Region I may suddenly cause pressure $P_1$ to increase and depart from a steady state value so that $P_1>P_2$ over a short time interval. The sudden increase in pressure $P_1$ causes unbalanced forces to act on the movable member 405 so that the movable member 405 may move away from the spacers 606 and the gap distance "d" increases. The one or more springs 610 may be further compressed so that $D_C<D_A$ as pressure $P_1$ increases. As a result, the housing 501 blocks more of the opening 601 so that area $R_C$ is less than area $R_A$ and the smaller area $R_C$ increases the flow resistance from Region I to Region II. In one embodiment, $C_V$ is less than about 0.3 for the pressure dampening device 200 when $P_1>P_2$. The increased flow resistance through openings 601 may compensate for the increase in pressure $P_1$ so that the amount of gas in Region II does not increase and pressure $P_2$ remains approximately constant during the pressure perturbation. In one embodiment, the pressure dampening device 200 is suitably adapted to maintain a non-zero value for the area $R_C$ so that flow is not shut off when $P_1>P_2$. In another embodiment, the pressure dampening device 200 is suitably adapted to remain open and allow continuous fluid flow through said device for all pressures $P_1$ and $P_2$.

As described herein, the pressure $P_1$ may be slightly greater than pressure $P_2$ in the steady state due to flow resistance of the pressure dampening device 200, and so the approximate equality $P_1 \approx P_2$ of FIG. 8A may include the difference in pressures due to steady state flow resistance. FIGS. 8B and 8C show transient pressures $P_1$ and $P_2$ due to a pressure perturbation and the effect the transient pressures have on the pressure dampening device 200 compared to the steady state pressures shown in FIG. 8A.

The embodiments described previously herein for FIGS. 8A-8C describe pressure changes and pressure change ratios ρ for pressure perturbations which originate upstream of the pressure dampening device 200. In another embodiment, the pressure dampening device 200 may be suitably adapted to dampen small pressure perturbations which originate downstream and/or upstream of the pressure dampening device 200 so that pressure $P_2$ remains approximately constant. In one embodiment, the pressure change $\Delta P_2$ is less than or equal to about 0.5 psia.

The relatively small size of the pressure dampening device 200 allows the use of small components with low mass. A movable member 405 having low mass may be used with one or more springs 610 having small spring constants so that the pressure dampening device 200 is sensitive to small pressure fluctuations and can quickly respond to dampen the pressure fluctuations. Different pressure dampening devices 200 may be provided which are adapted for dampening pressure perturbations over different flow regimes. Each flow regime may comprise a range of flow rates, process gas pressures, and other flow parameters which are used for a particular substrate processing application. In one embodiment, the steady state pressure $P_1$ ranges from about 7 psia to about 60 psia. In one embodiment, the flow rate ranges from about 0.5 sccm (standard cubic centimeters per minute) to about 10 slm (standard liters per minute), and preferably from about 0.5 sccm to about 150 sccm. Different spring constants, movable member 405 masses, or other design parameters may be selected to optimize the dampening of pressure perturbations for a particular flow regime.

Figure 9:
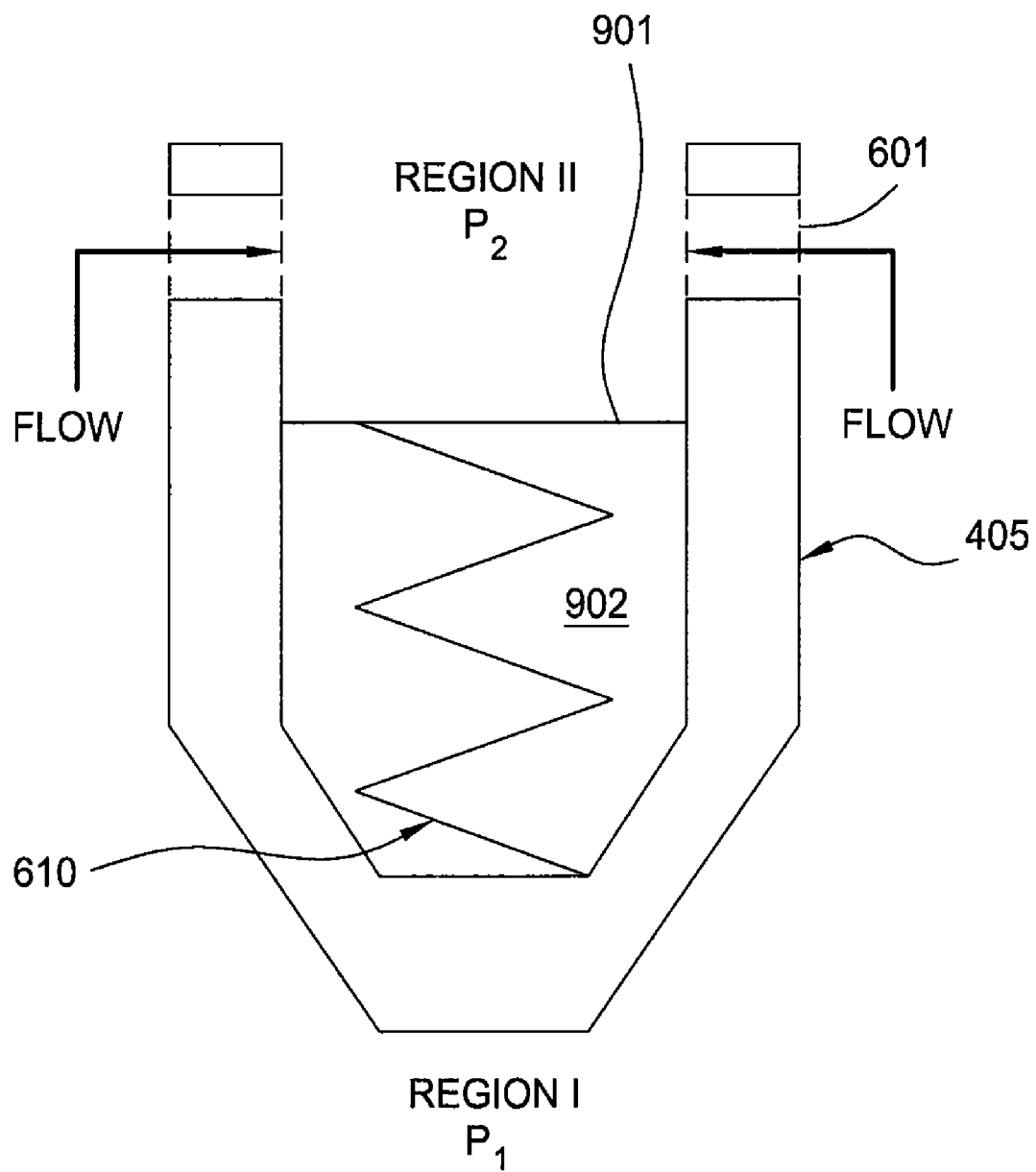
FIG. 9 is a schematic view of the pressure dampening device shown in FIG. 6A according to another embodiment of the invention.

FIG. 9 is a schematic view of the pressure dampening device 200 shown in FIG. 6A according to another embodiment of the invention. The pressure dampening device 200 may be suitably adapted so that the one or more springs 610 are isolated from the wetted path of the process gas. A partition 901 is located upstream of openings 601 and the partition 901 separates Region II from a spring-containing region 902. The partition 901 and movable member 405 enclose the spring-containing region 902 which contains one or more springs 610, and the one or more springs 610 are in contact with the movable member 405 and partition 901. The partition 901 is suitably adapted so that process gas is not in fluid communication with the spring-containing region 902, and the partition 901 provides a substantially fixed surface so that the one or more springs 610 may expand or contract as the movable member 405 moves in response to pressure changes.

While the foregoing is directed to embodiments of the present invention, other and further embodiments of the invention may be devised without departing from the basic scope thereof, and the scope thereof is determined by the claims that follow.

What is claimed is:

1. A fluid control assembly, comprising:
   a mounting substrate;
   a fluid control element; and
   a pressure dampening device disposed between the mounting substrate and fluid control element, the pressure dampening device comprising a movable member in contact with one or more springs, the movable member having at least one opening formed therein, and the movable member separates a first region from a second region, wherein the opening has an area through which the fluid may flow from the first region to the second region, and the size of said area is determined by the fluid pressures in the first and second regions, and wherein the pressure dampening device allows the continuous flow of a fluid through said device and dampens pressure perturbations in said fluid.

2. The fluid control assembly of claim 1, wherein the fluid comprises a process gas.

3. The fluid control assembly of claim 1, wherein the fluid control element comprises a combination pneumatic/manual valve.

4. A fluid control assembly, comprising:
a mounting substrate;
a fluid control element;
a pressure dampening device disposed between the mounting substrate and fluid control element;
a pressure insensitive mass flow controller disposed downstream of the pressure dampening device, wherein the pressure dampening device allows the continuous flow of a fluid through said device and dampens pressure perturbations in said fluid.

5. A pressure dampening device, comprising:
a housing comprising a central inlet port and a peripheral outlet port disposed on a first surface of the housing, and a central outlet port and a peripheral inlet port disposed on a second, opposing surface of the housing;
a movable member disposed within the housing, the movable member in contact with one or more springs;
at least one spacer disposed between the movable member and the housing;
at least one opening formed in the movable member; and
a first region separated from a second region by the movable member, the first region is in fluid communication with the central inlet port and the second region is in fluid communication with the central outlet port, wherein the opening has an area through which a fluid may flow from the first region to the second region, and the size of the area is determined by a fluid pressure $P_1$ in the first region and a fluid pressure $P_2$ in the second region, and wherein the pressure dampening device allows continuous flow of the fluid through the device.

6. The pressure dampening device of claim 5, wherein the volumetric flow coefficient ($C_V$) of the pressure dampening device is at least about 0.3 when pressures $P_1$ and $P_2$ are in a steady state.

7. The pressure dampening device of claim 5, wherein the volumetric flow coefficient ($C_V$) of the pressure dampening device is greater than about 0.3 when $P_1 < P_2$.

8. The pressure dampening device of claim 5, wherein the volumetric flow coefficient ($C_V$) of the pressure dampening device is less than about 0.3 when pressure $P_1$ is greater than pressure $P_2$.

9. The pressure dampening device of claim 5, wherein the pressure change ratio ($\Delta P_2/\Delta P_1$) ranges from about 0.01 to about 1 when the pressure perturbation originates upstream of the pressure dampening device.

10. The pressure dampening device of claim 5, wherein a gap exists between the movable member and spacer when pressures $P_1$ and $P_2$ are in a steady state.

11. The pressure dampening device of claim 5, wherein the movable member comprises a hollow cylinder having a tapered closed end.

12. The pressure dampening device of claim 5, wherein the volume of the housing ranges from about 0.3 cubic inches to about 2.2 cubic inches.

13. The pressure dampening device of claim 5, wherein the one or more springs are isolated from the wetted path of the fluid.

14. The pressure dampening device of claim 13, further comprising a partition, wherein the one or more springs are enclosed by the movable member and the partition, and wherein the one or more springs are in contact with the movable member and the partition.

15. A method for dampening pressure perturbations in a fluid stream, the method comprising:
directing the fluid stream through a conduit, said conduit comprising an inlet port, an outlet port, a movable element, and one or more springs in contact with the movable element;
separating the fluid stream into a first region in fluid communication with the inlet port and a second region in fluid communication with the outlet port, wherein the first region is separated from the second region by the movable element, wherein the first region is in fluid communication with the second region through at least one opening in the movable element, and wherein the opening comprises an area through which the fluid may flow; and
adjusting the size of said area to change the flow resistance between the first region and the second region so that the fluid pressure in the second region remains approximately constant, wherein adjusting the size of the area comprises displacing the movable element, and wherein the movable element is displaced by the fluid pressures in the first and second regions.

16. The method of claim 15, wherein adjusting the size of the area allows a continuous flow of fluid through the area.

17. The method of claim 15, wherein the flow resistance is changed so that the volumetric flow coefficient ($C_V$) of the conduit is at least about 0.3 when the fluid pressure in the first region and the fluid pressure in the second region are in a steady state.

* * * * *

UNITED STATES PATENT AND TRADEMARK OFFICE
CERTIFICATE OF CORRECTION

PATENT NO.       : 8,015,989 B2
APPLICATION NO.  : 12/135857
DATED            : September 13, 2011
INVENTOR(S)      : Lane et al.

It is certified that error appears in the above-identified patent and that said Letters Patent is hereby corrected as shown below:

In the Detailed Description:
Column 11, Lines 29-53, please delete

"Figure 8C depicts a schematic detail view of the pressure dampening device 200 shown in Figure 6B when $P_1>P_2$ according to one embodiment of the invention. A pressure perturbation in Region I may suddenly cause pressure $P_1$ to increase and depart from a steady state value so that $P_1>P_2$ over a short time interval. The sudden increase in pressure $P_1$ causes unbalanced forces to act on the movable member 405 so that the movable member 405 may move away from the spacers 606 and the gap distance "d" increases. The one or more springs 610 may be further compressed so that $D_C<D_A$ as pressure $P_1$ increases. As a result, the housing 501 blocks more of the opening 601 so that area $R_C$ is less than area $R_A$ and the smaller area $R_C$ increases the flow resistance from Region I to Region II. In one embodiment, $C_V$ is less than about 0.3 for the pressure dampening device 200 when $P_1>P_2$. The increased flow resistance through openings 601 may compensate for the increase in pressure $P_1$ so that the amount of gas in Region II does not increase and pressure $P_2$ remains approximately constant during the pressure perturbation. In one embodiment, the pressure dampening device 200 is suitably adapted to maintain a non-zero value for the area $R_C$ so that flow is not shut off when $P_1>P_2$. In another embodiment, the pressure dampening device 200 is suitably adapted to remain open and allow continuous fluid flow through said device for all pressures $P_1$ and $P_2$.".

Signed and Sealed this
Third Day of January, 2012

David J. Kappos
*Director of the United States Patent and Trademark Office*